United States Patent
Jiang et al.

(10) Patent No.: US 8,740,417 B2
(45) Date of Patent: Jun. 3, 2014

(54) SECONDARY LIGHT DISTRIBUTION LENS FOR MULTI-CHIP SEMICONDUCTOR (LED) LIGHTING

(75) Inventors: Jin Bo Jiang, Hong Kong (HK); Wen Da Jiang, Hong Kong (HK)

(73) Assignee: Huizhou Light Engine Limited, Huizhou, Guangdong (CN)

( * ) Notice: Subject to any disclaimer, the term of this patent is extended or adjusted under 35 U.S.C. 154(b) by 448 days.

(21) Appl. No.: 13/224,072

(22) Filed: Sep. 1, 2011

(65) Prior Publication Data
US 2013/0058103 A1 Mar. 7, 2013

(51) Int. Cl.
| F21V 3/00 | (2006.01) |
| F21V 5/00 | (2006.01) |
| F21V 5/02 | (2006.01) |
| F21V 13/04 | (2006.01) |
| F21K 99/00 | (2010.01) |
| F21V 7/00 | (2006.01) |

(52) U.S. Cl.
CPC . *F21V 5/02* (2013.01); *F21V 13/04* (2013.01); *F21K 9/00* (2013.01); *F21V 7/0091* (2013.01)
USPC ............... 362/311.02; 362/296.05; 362/309; 362/327; 362/343; 362/348

(58) Field of Classification Search
CPC ........... F21V 5/02; F21V 5/04; F21V 7/0091; F21V 13/04; F21K 9/00
USPC ............... 362/245, 296.05, 308, 309, 311.02, 362/327, 335, 339, 343, 348
See application file for complete search history.

(56) References Cited

U.S. PATENT DOCUMENTS

| 7,563,004 | B2 | 7/2009 | Pickard et al. |
| 8,231,250 | B2 * | 7/2012 | Bailey ...................... 362/311.02 |
| 2011/0051394 | A1 | 3/2011 | Bailey |
| 2011/0080728 | A1 * | 4/2011 | Nakagawa et al. ........... 362/235 |

FOREIGN PATENT DOCUMENTS

| CN | 201787486 U | 4/2011 |
| CN | 201852037 U | 6/2011 |
| CN | 102162625 A | 8/2011 |
| JP | 2011-095660 A | 5/2011 |

* cited by examiner

*Primary Examiner* — Stephen F Husar
(74) *Attorney, Agent, or Firm* — Muncy, Geissler, Olds & Lowe, P.C.

(57) ABSTRACT

A lens comprising: a lens body; a total reflection surface provided on an outer side of the lens body, the reflection surface being in the form of a scalelike polyhedron; a recess formed on a bottom side of the lens body at a central region thereof for accommodating a LED, the recess having a side surface and a central surface; a micro lens array formed at the central surface of the recess; and a light-emitting surface provided at a top side of the lens body; wherein a substantially uniform circular light spot is formed by the lens.

14 Claims, 12 Drawing Sheets

SECONDARY LIGHT DISTRIBUTION LENS FOR MULTI-CHIP SEMICONDUCTOR (LED) LIGHTING

FIELD OF THE INVENTION

The present invention relates to an optical lens, and more particularly, relates to a secondary light distribution lens for multi-chip semiconductor (LED) lighting.

BACKGROUND OF THE INVENTION

The secondary light distribution lens for most of current LEDs are mainly smooth total reflection lens, the basic structure of which lies in that a smooth aspherical lens for converging light is positioned on top of a concave portion in the centre area, around which a smooth total reflection face is disposed. This lens mainly applies to the light distribution of a single-chip LED, which represents a circular and efficient light spot distribution. However, regarding the multi-chip LED, this lens may project such a light spot that forms square or petaline chip shadow due to image of the chip formed by the central aspherical face.

SUMMARY OF THE INVENTION

In view of the disadvantage of the current total reflection lens, the present invention proposed a lens comprising: (a) a lens body; (b) a total reflection surface provided on an outer side of the lens body, the reflection surface being in the form of a scalelike polyhedron; (c) a recess formed on a bottom side of the lens body at a central region thereof for accommodating a LED, the recess having a side surface and a central surface; a micro lens array formed at the central surface of the recess; and (e) a light-emitting surface provided at a top side of the lens body; wherein a substantially uniform circular light spot is formed by the lens.

The LED is single-chip or multi-chip, with different colors of red, green or blue.

The scalelike polyhedron comprises rhomboid, diamond, square or spiral surfaces.

The side surface of the recess is in the shape of a cylinder, a cone or a revolving arc.

The light-emitting surface comprises one or more planar and curved surfaces.

The light-emitting surface comprises a concave or convex spherical surface, an aspherical surface, a Fresnel surface, a pillow lens array, or a corrugated strip surface.

Each scale on the scalelike polyhedron of the reflection surface has a planar or arc curved surface.

The shape of micro lens array is circular, hexagonal, square, corrugated, or radiant in shape.

Preferably, a part of the light emitting from the LED and directing towards the side surface of the recess is refracted by the side surface, reflected by the reflection surface, and refracted by and emitted from the light-emitting surface, generating a light distribution with an angle ±θ (full beam angle of 2θ), where θ is 2° to 45°, and wherein the scalelike reflection surface is provided for breaking the boundary of light distribution, whereby every discrete scale generates a range of light distribution of its own, based upon which the superposition of the light distribution from a plurality of scales form a considerably uniform light spot distribution at certain angle.

Preferably, a part of light emitting from the LED and directing towards the central surface of the recess is refracted by the central surface, and refracted by and emitted from the light-emitting surface, generating a light distribution with an angle of ±θ, where θ is 2° to 45°, and wherein the micro lens array is provided for light blending.

Preferably, the light reflected from the light striking at the lowermost edge of the reflection surface is parallel to the optical axis after being transmitted from said light-emitting surface, the light reflected from the light striking at the uppermost edge of the reflection surface forms an angle θ with the optical axis after being transmitted from said light-emitting surface; and the light reflected from the light striking at the surfaces between the uppermost and the lowermost edges of the reflection surface forms an angle with the optical axis ranging from 0~θ degrees according to certain ratio after being transmitted from said light-emitting surface.

The numerical aperture angle of each micro lens at the central surface of the recess is ±θ (full beam angle of 2θ) in combination with the light-emitting surface.

Preferably, the lens further comprises a flange provided along a rim at a front side of the lens body, and legs formed on the flange for fixing the position of the lens body.

Preferably, the rear side of the lens body is provided with a planar surface connecting the side surface of the recess and the reflection surface to facilitate the securing of the lens body to a base of the LED.

According to the light distribution solution of non-image-optics of the present invention, the light mixing theory is integrated into a secondary optical lens, and wherein light mixing is achieved by the micro lens array in the center area and a rhomboid, square or diamond scalelike polyhedron reflection face in the side, whereby the desired beam angle is achieved. With present invention, a considerably circular light spot may be formed with whatever chip arrangement, in which no shadow imaged by the chip shape can be found. The LED used with present invention may be single-chip or multi-chip, with different colors such as red, green and blue.

BRIEF DESCRIPTION OF THE DRAWINGS

The accompanying drawings, which are incorporated in and constitutes a part of this specification, illustrate an implementation of the invention and, together with the description, serve to explain the advantages and principles of the invention. In the drawings.

FIG. 5(*a*) shows the computer simulation for the specific embodiment 1;

FIG. 5(*b*) shows the light tracks of the lens according to the specific embodiment 1;

FIG. 6(*a*) shows the light spot shape and illuminance distribution in the distance of 1 meter from the lens according to the specific embodiment 1;

FIG. 6(*b*) is the contour illuminance chart of the lens according to the specific embodiment 1;

DETAILED DESCRIPTION OF THE INVENTION

Specific Embodiment 1

Figure 1:
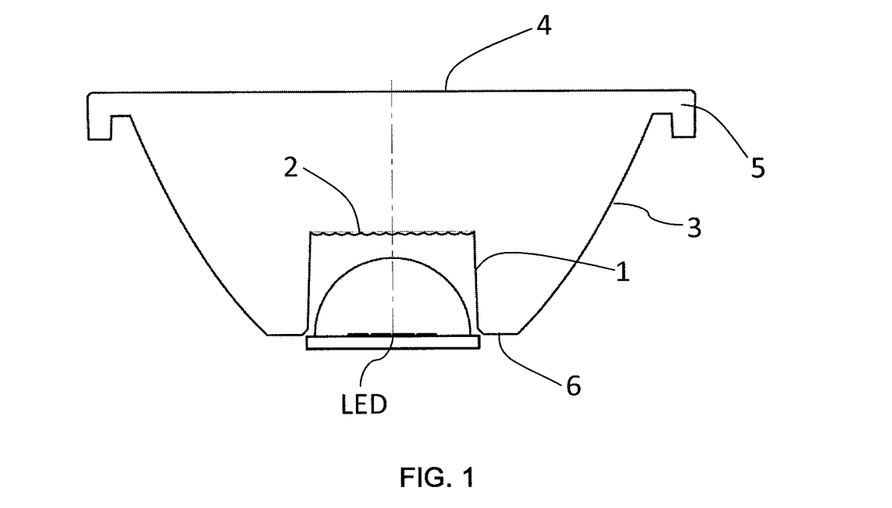
FIG. 1 is section view of the lens according to the specific embodiment 1.

A specific embodiment 1 of the secondary optical lens according to present invention is shown in FIG. 1. A recess is positioned on bottom of the lens in the center area. The recess is used to arrange a multi-chip LED light source, the top portion 2 of which consists of plurality of micro lens (micro lens array). The shape of the micro lens array may be circular, hexagon, square, corrugated, radiant shape and the like irregular shapes. The side face 1 of the recess is a cylindrical, cone or arc revolution face. The secondary light distribution lens has a total reflection face 3 on the outer side, which consists of a rhomboid, diamond, square or spiral scalelike polyhedron; the top 4 of the lens is the emitting face, which may be one or more planes or curve faces, and which may be a concave or convex spherical face, aspherical face, Fresnel face, pillow lens array, corrugated strip face and the like free faces; the rim 5 on top of the lens is a flange for fixing, which does not function for optical effect, and which may present any shape, and which may have claws thereon to fix the position of the lens. The bottom 6 of the lens is a plane for connecting the side face 1 of the recess and the total reflection face 3 on the outer side, which does not function for optical effect, and which is provided for positioning the lens on the base of the LED.

Figure 2:
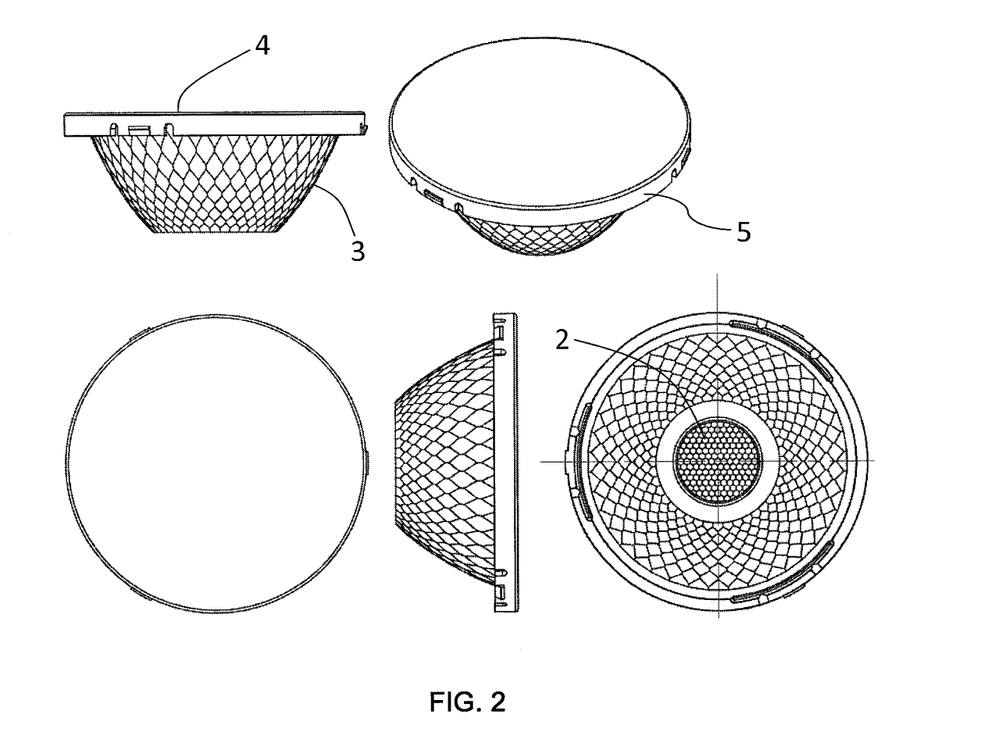
FIG. 2 is view of lens of the specific embodiment 1, respectively showing the front view, the isometric view, the top view, the side view and the bottom view.

FIG. 2 shows a view of the lens 3 of the specific embodiment 1 according to present invention. It shows that the total reflection face 3 on the outer side of the lens consists of a rhomboid, square or diamond scalelike polyhedron, preferably a diamond polyhedron, in which every small scale of the polyhedrons may be a plane or arc curved face. As the light distribution of a smooth reflection face to a incident light is continuous, a bright speck or a dark speck will be formed when the LED light source is a multi-chip LED, which results non-uniformity of the light spot distribution. The scalelike reflection face herein is provided for breaking the boundary of light distribution, whereby every discrete scale may generate a range of distribution on its own, based upon which the superposition of light distribution from a plurality of scales will form a considerably uniform light spot distribution in certain angle. Furthermore, the secondary optical lens has a recess on bottom of the lens in the center area, which is used to position the LED, and the top 2 of which consists of a micro lens array, which may effect light mixing for incident light from the LED, whereby a considerably uniform light distribution is formed in certain angle.

Figure 3:
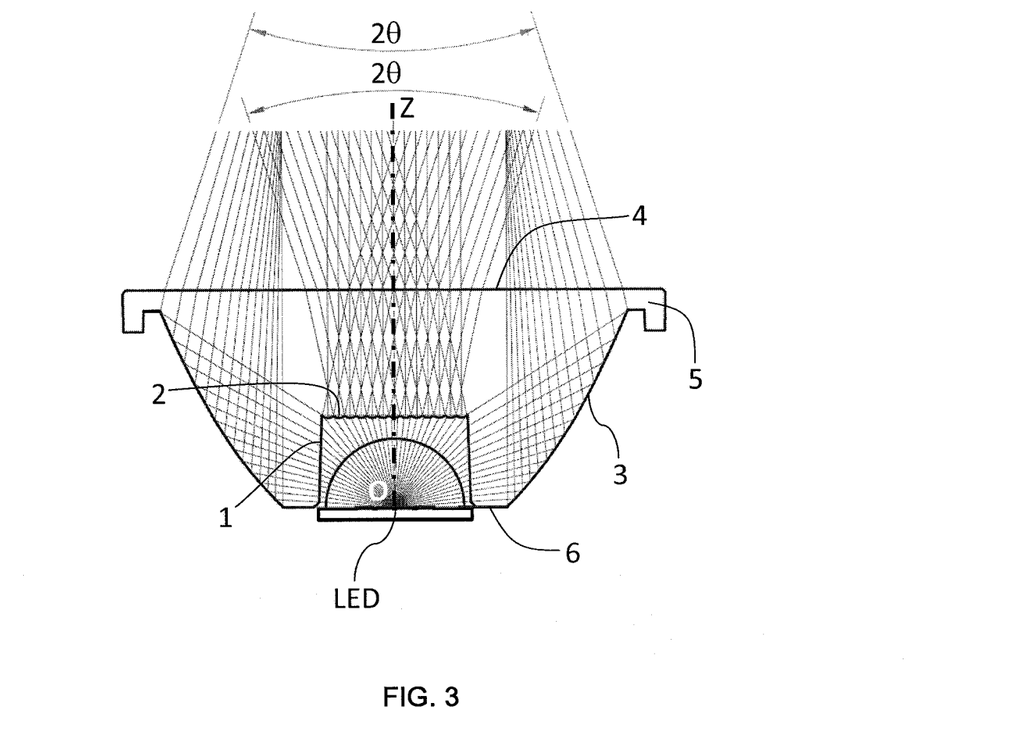
FIG. 3 is designing principle for the lens of specific embodiment 1.
Figure 4:
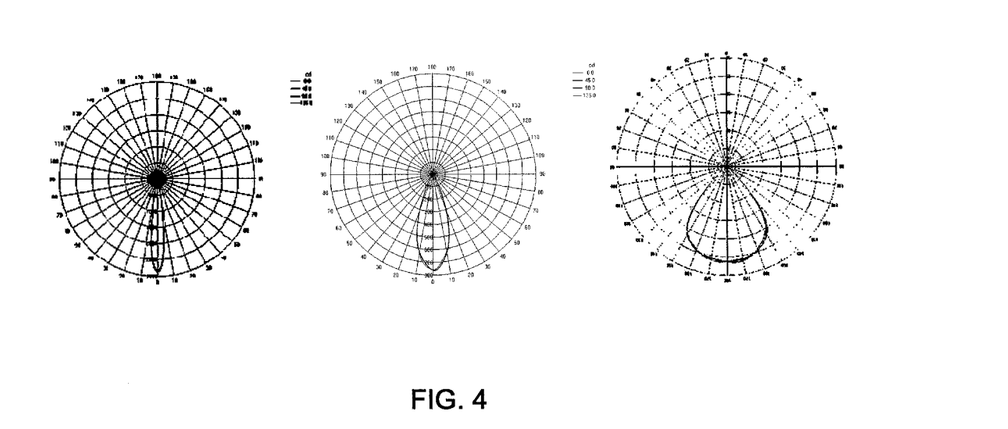
FIG. 4 is light intensity far field angle distribution of the lens according to present embodiment when θ equals to 5°, 18°, 45°.

FIG. 3 shows the designing principle for the lens of specific embodiment 1. A part of the light emitting from the LED and directing to the side impacts on the total reflection face 3 on the outer side of the lens after passing the concave side face 1, whereafter the reflection light emitting from the emitting face 4 on top of the lens generates a light distribution including an angle ±θ (full beam angle is 2θ). A part of light emitting from the LED and directing to the center emits from the emitting face 4 on top of the lens after passing the micro lens array on top of the recess, resulting a light distribution including an angle ±θ. The characteristic of the light distribution of the reflection face 3 on the outer side lies in that the reflection light from the edge light impacting on the lowest edge of the reflection face 3 forms an angle of zero degree with the optical axis OZ, i.e. parallel to the optical axis OZ; and that the reflection light from the edge light impacting on the topmost edge of the reflection face 3, after emitting from the emitting face 4, forms an angle θ with the optical axis; and that the reflection light from the light impacting on other places on the reflection face 3, after emitting from the emitting face 4, forms such an angle with the optical axis that distributes in the range of 0~θ according to certain radio. The characteristic of the light distribution of the micro lens array on top of the recess disposed on bottom of the lens in the center area lies in that the numerical aperture angle of each micro lens is ±θ (full beam angle is 2θ) in combination with the emitting face 4 on top of the lens, and that the emitting light from a plurality of micro lenses superposes to form a uniform light distribution in the angle ±θ, whereby it effects light mixing for light from the LED. The lens used with present embodiment has a light distribution angle θ, which may be any degree from 2 degree to 45 degree (full beam angle 2θ is 4°~90°), if necessary. FIG. 4 shows the light distribution curve of the lens according to present embodiment when the lens is a narrow beam, medium beam and broad beam lens, and when θ equals to 5°, 18°, 45° (full beam angle is 10°, 36°, 90°).

Figure 5A:
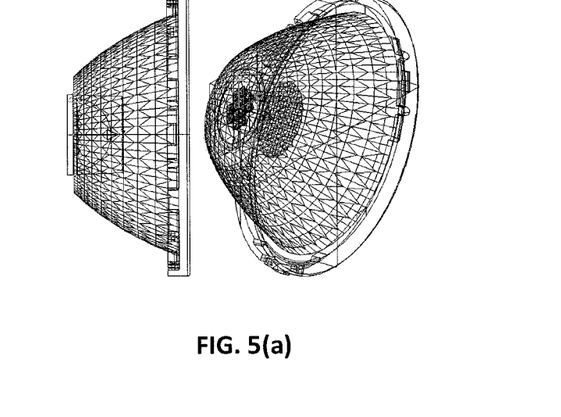
Figure 5B:
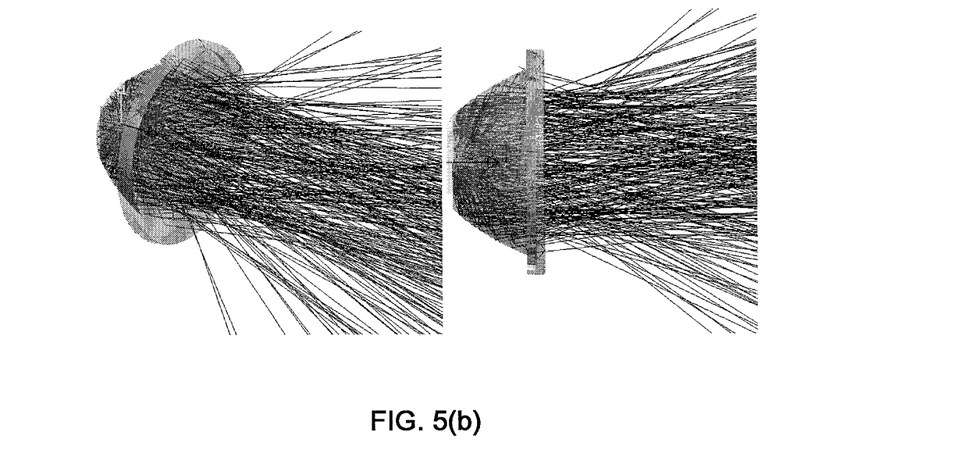
Figure 6A:
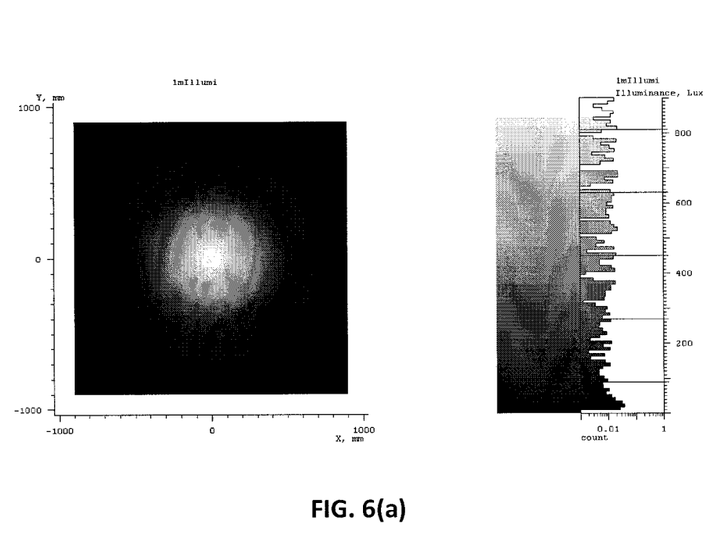
Figure 6B:
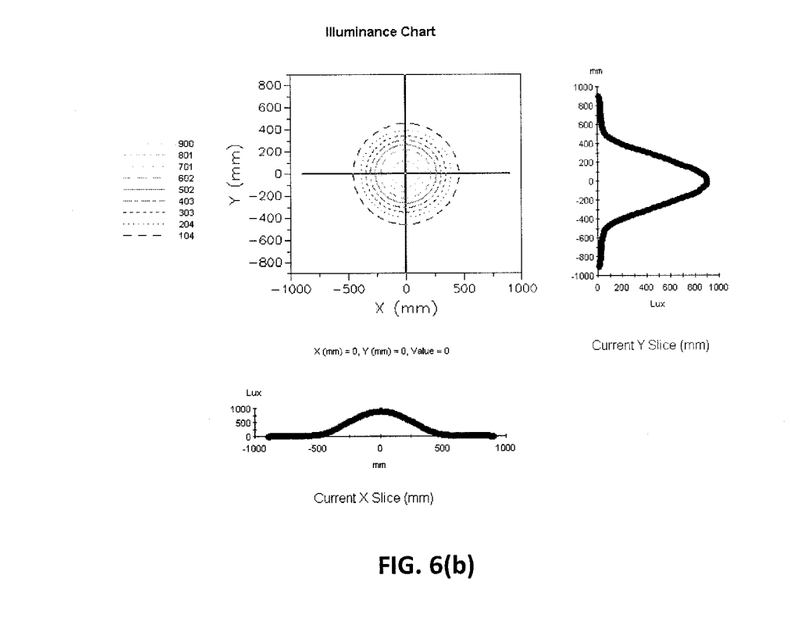
Figure 7:
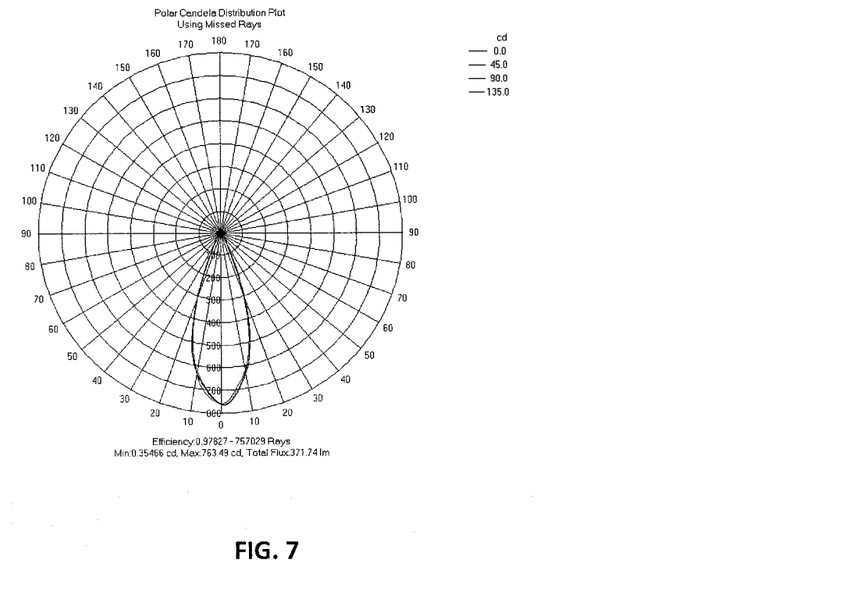
FIG. 7 is far-field angular distribution (light distribution curve) of the light intensity for the lens according to the specific embodiment 1.

FIG. 5(a) shows the computer simulation for the specific embodiment 1, wherein it assumes the light source of the LED is a CREE MT-G with 12 chips, the light flux of which LED is 380 Lumen, and wherein the lens thereof is designed according to a full beam angle of 36° (i.e. θ=18°). FIG. 5(b) shows the light tracks of the lens. FIG. 6(a) shows the light spot shape and illuminance distribution in the distance of 1 meter from the lens according to the specific embodiment 1; FIG. 6(b) is the contour illuminance chart of the lens according to the specific embodiment 1, in which the light spot presents a circular shape and no square or petaline shadow formed by projection due to the arrangement of the chips are found. FIG. 7 shows the far-field angular distribution (light distribution curve) of the lens, in which the light beam angle is ±18° at the location of half light intensity. The theoretical efficiency of the lens by simulation is 97.827%. If it is assumed that the luminousness of the lens material is 92%, then the optical efficiency of the lens produced may reach to 90%.

Specific Embodiment 2

Figure 8:
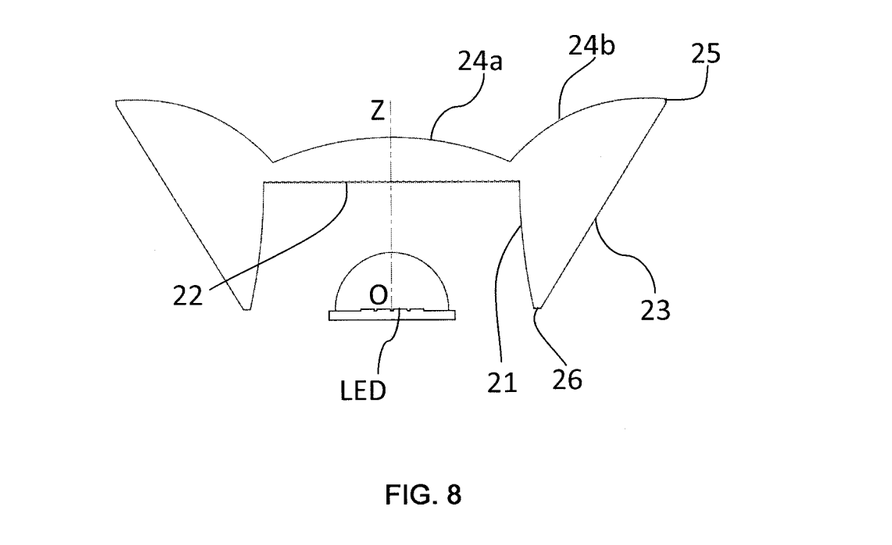
FIG. 8 is a section view of the lens according to the specific embodiment 2.

The section view for the specific embodiment 2 of the secondary optical lens according to present invention is shown in FIG. 8. The emitting face on top of the lens as shown is divided into 2 portions 24a and 24b, wherein 24a presents a convex aspherical face, and 24b presents a revolution face with a arc generating line. A recess is disposed on bottom of the lens in the center area, the top 22 of which consists of micro lens array, and the side face 21 of which presents a cylindrical, cone or revolution face, preferably a revolution face with a arc generating line. The reflection face on the outer side may also consist of a rhomboid, diamond, square or spiral scalelike polyhedron, preferably a square scalelike polyhedron. The rim 25 on top of the lens is a cylindrical face for fixing, which does not function for optical effect, and which may have claws on its outer side to fix the position of the lens. The bottom 6 of the lens is a plane for connecting the side face 21 of the recess and the total reflection face 23 on the outer side, which does not function for optical effect.

Figure 9:
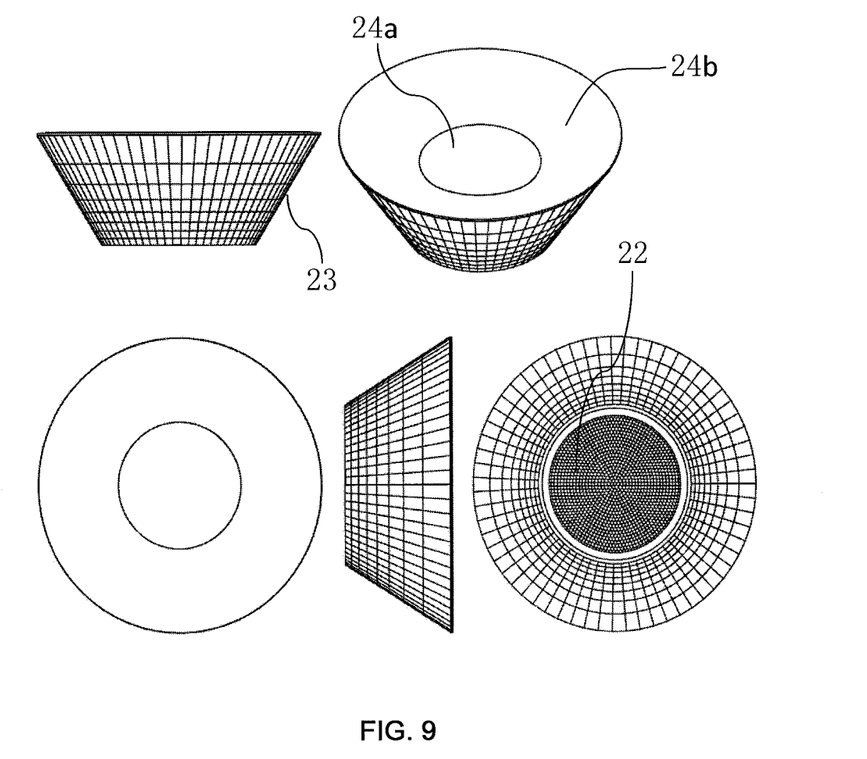
FIG. 9 respectively shows the front view, the isometric view, the top view, the side view and the bottom view of the lens according to the specific embodiment 2.

The orthographic views for the specific embodiment 2 of the secondary optical lens according to present invention is shown in FIG. 9. It is seen from the bottom view that a recess is disposed on bottom of the lens in the center area, the top 22 of which consists of a micro lens array, in which the shape of the micro lens array may be a circular, hexagon, square, corrugated, radiant shape and the like irregular shapes, preferably a radiant shape.

Figure 10:
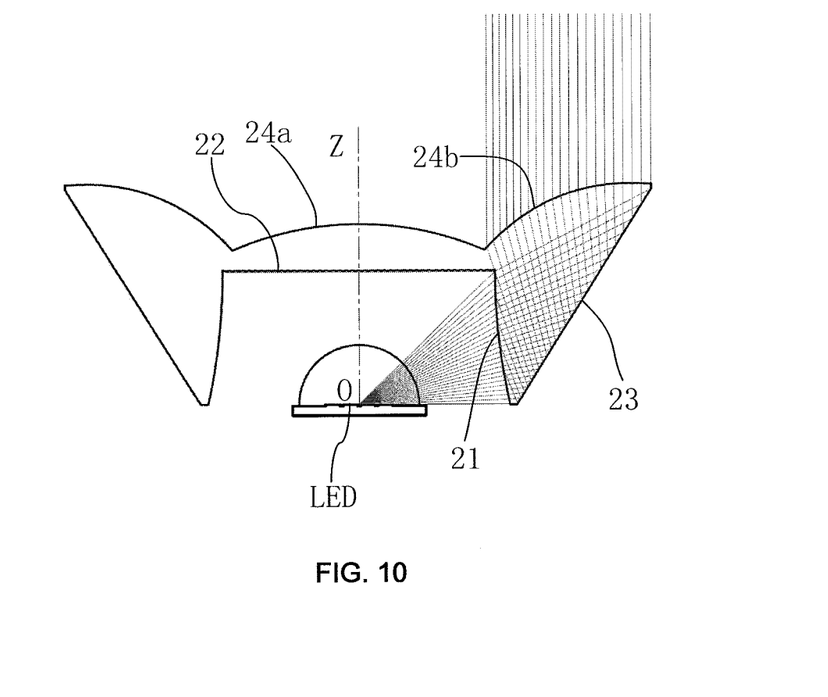
FIG. 10 is designing principle for the lens according to the specific embodiment 2

FIG. 10 shows the designing principle for the lens according to the specific embodiment 2 in accordance with present invention. The lens is a narrow angle lens, for which the light distribution of the lens may be designed according to a collimated light beam. A part of the light emitting from the LED and directing to the side impact on the scalelike total reflection face 23 on the outer side after passing the side face 22 of the recess. The reflection light from the total reflection face 23 emits collimatly after passing the emitting face 24b on top of the lens at the outer circle. A part of light emitting from the LED and directing to the center area emits collimatly from the emitting face 24a on top of the lens after passing the micro lens array on top 22 of the recess. As an additional light distribution curve face 24a disposed on top of the lens, which brings one additional freedom for light distribution design, a narrow light beam angle for the lens may be achieved in accordance with such structure with respect to a multi-chip LED light source. Naturally, a lens with a broad light beam angle may be achieved in accordance with present embodiment, as long as that the reflection face 23 on the outer circle together with the emitting face 24b are configured to have a light distribution of angle ±θ. Similarly, it is necessary that the micro lens array on top 22 of the recess disposed on bottom of the lens together with the emitting face 24a forms a numerical aperture of angle θ.

Figure 11A:
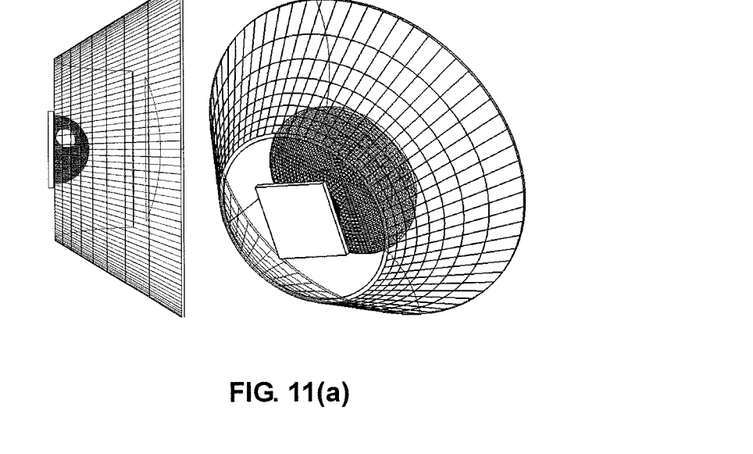
FIG. 11(a) shows the computer simulation for the specific embodiment 2.
Figure 11B:
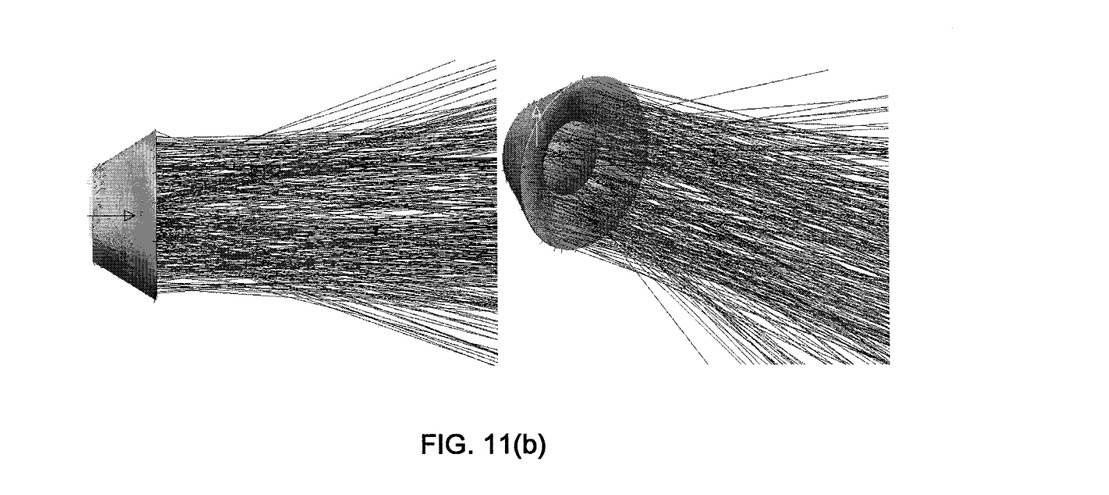
FIG. 11(b) shows the light tracks of the lens according to specific embodiment 2.

FIG. 11(a) shows the computer simulation for present embodiment, in which it is assumed that the LED light source is a CREE MT-G with 12 chips, the light flux of which LED is 380 Lumen, wherein the lens is a narrow angle lens designed according to collimated light. FIG. 11(b) shows the light tracks of the lens according to specific embodiment 2.

Figure 12:
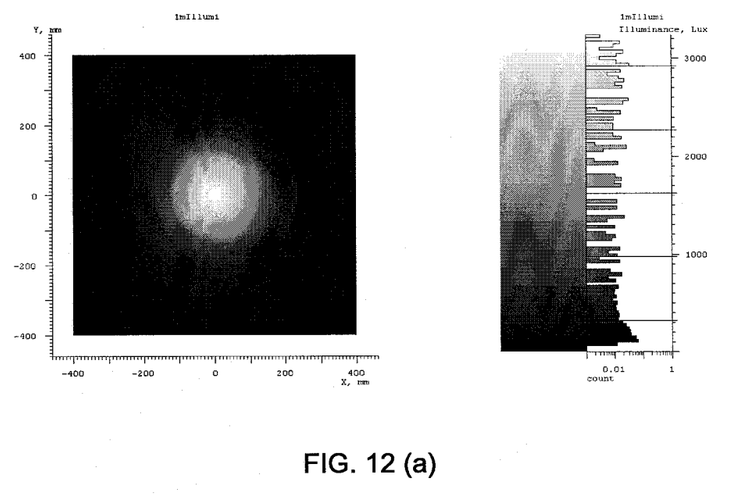
FIG. 12(a) is light spot shape and illuminance distribution in the distance of 1 meter from the lens according to the specific embodiment 2.
FIG. 12(b) is the contour illuminance chart of the lens according to the specific embodiment 2.
Figure 13:
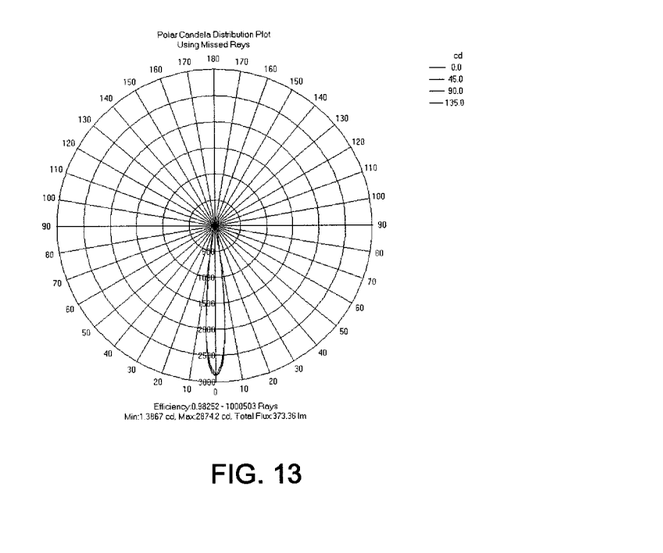
FIG. 13 is far-field angular distribution (light distribution curve) of the light intensity for the lens according to the specific embodiment 2.

FIG. 12(a) is light spot shape and illuminance distribution in the distance of 1 meter from the lens according to the specific embodiment 2; and FIG. 12(b) is the contour illuminance chart of the lens according to the specific embodiment 2, in which the light spot presents a circular shape and no square or petaline shadow formed by projection due to the arrangement of the chips are found. FIG. 13 shows the far-field angular distribution (light distribution curve) of the light intensity for the lens, in which the light beam angle is ±5° at the location of half light intensity. The theoretical efficiency of the lens by simulation is 98.252%. If it is assumed that the luminousness of the lens material is 92%, then the optical efficiency of the lens produced may reach to 90%.

Other Specific Embodiments

Figure 14:
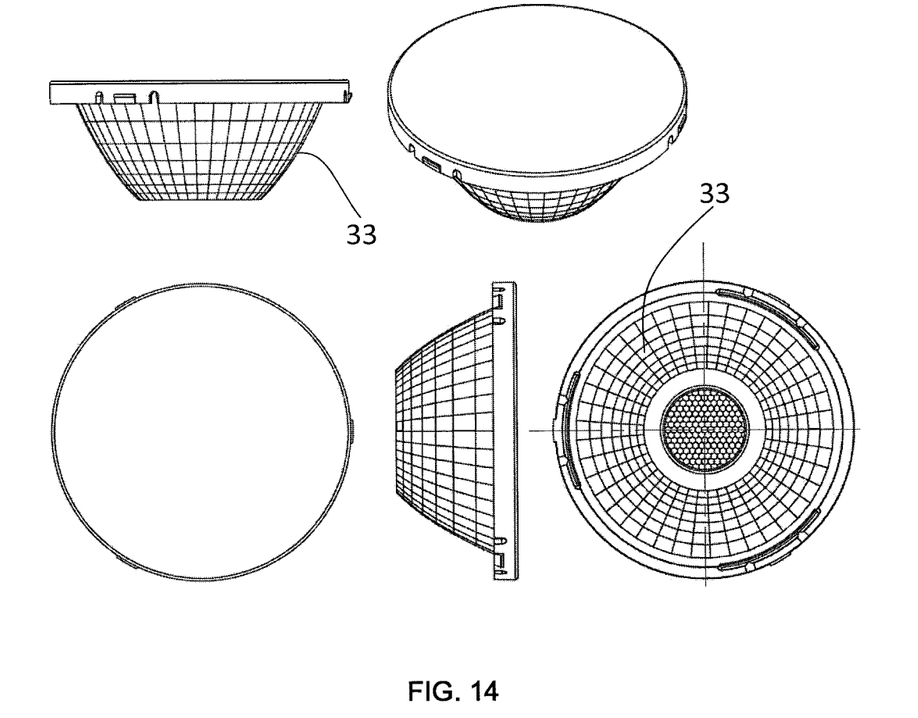
FIG. 14 respectively shows the front view, the isometric view, the top view, the side view and the bottom view of the lens according to the specific embodiment 3 with the reflection face on the outer side consisting of square scale.

There are several other embodiments for the secondary optical lens according to present invention. FIG. 14 shows the specific embodiment 3 according to present invention, in which most of the structure is identical to the specific embodiment 1 except that the total reflection face 33 on the outer side of the lens consists of square scale. The present embodiment shares the same light beam angle, light spot shape and optical efficiency with the specific embodiment 1.

Figure 15:
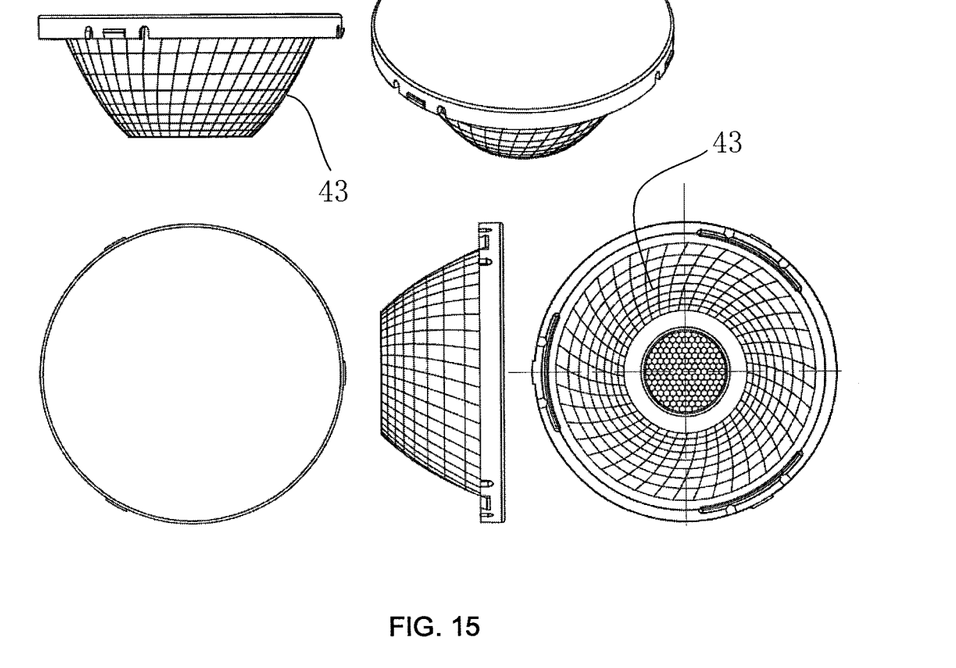
FIG. 15 respectively shows the front view, the isometric view, the top view, the side view and the bottom view of the lens according to the specific embodiment 4 with a reflection face on the outer side consisting of spiral scale.

FIG. 15 shows the specific embodiment 14 according to present invention, in which most of the structure is identical to the specific embodiment 1 except that the total reflection face 43 on the outer side of the lens consists of spiral scale. The present embodiment shares the same light beam angle, light spot shape and optical efficiency with the specific embodiment 1.

Figure 16:
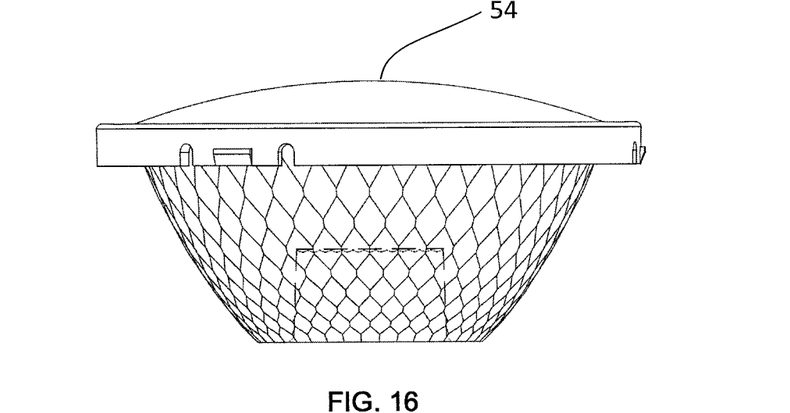
FIG. 16 shows the lens according to the specific embodiment 5 with a convex emitting face on top of the lens.

FIG. 16 shows the specific embodiment 5 according to present invention. The lower part of the lens in present embodiment is identical to the specific embodiment 1, while the emitting face 54 on top of the lens is a convex face, which may be a spherical face, an aspherical face or free face. The convex emitting face may converge the emitting light at certain distance, forming a circular or other shaped converging light spot.

Figure 17:
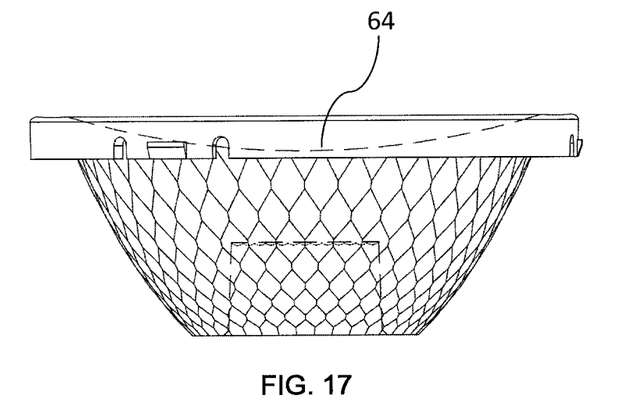
FIG. 17 shows the lens according to the specific embodiment 6 with a concave emitting face on top of the lens.

FIG. 17 shows the specific embodiment 6 according to present invention. The lower part of the lens in present embodiment is identical to the specific embodiment 1, while the emitting face 64 on top of the lens is a concave face, which may be a spherical face, an aspherical face or free face. The concave emitting face may diverge the emitting light, forming a circular or other shaped light spot with a comparative broad lighting range.

Figure 18:
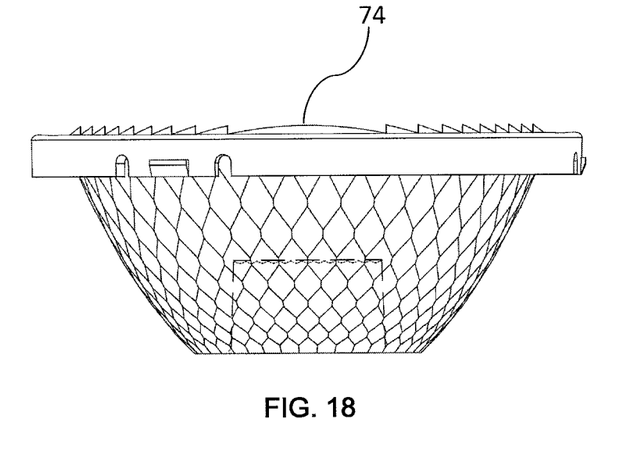
FIG. 18 shows the lens according to the specific embodiment 7 with a Fresnel emitting face on top of the lens.

FIG. 18 shows the specific embodiment 7 according to present invention. The lower part of the lens in present embodiment is identical to the specific embodiment 1, while the emitting face 74 on top of the lens is a Fresnel face. The Fresnel face may uniformly distribute the emitting converging (or diverging) light, forming a more uniform light spot distribution.

Figure 19:
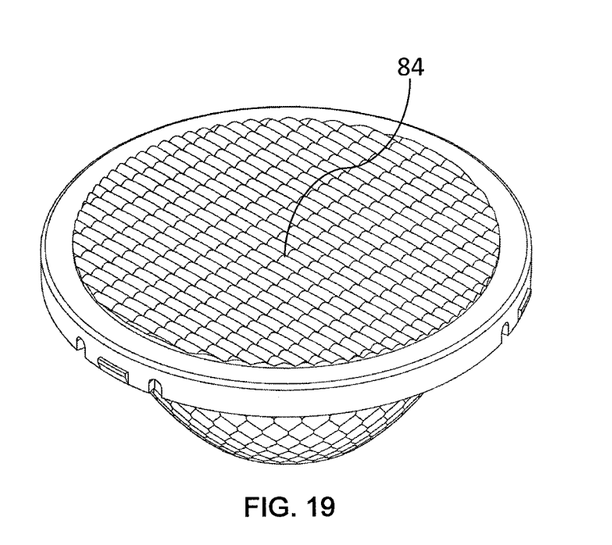
FIG. 19 shows the lens according to the specific embodiment 8 with a emitting face of pillow lens array on top of the lens.

FIG. 19 shows the specific embodiment 8 according to present invention. The lower part of the lens in present embodiment is identical to the specific embodiment 1, while the emitting face 84 on top of the lens is a pillow lens array. Since the pillow lens has different curvature radius in X and Y direction, which results the emitting light of the lens has the different light beam angles in the orthogonal X and Y directions. The present embodiment may emit a oblong light spot with different light beam angle in the X and Y direction that can be used in vehicle lighting and traffic lighting.

Figure 20:
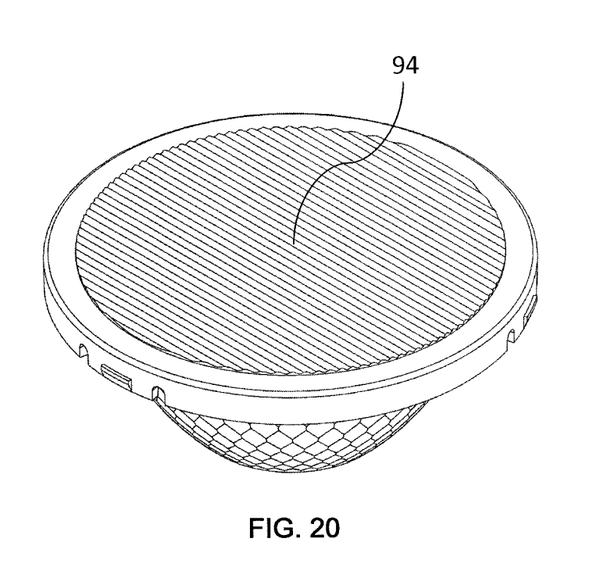
FIG. 20 shows the lens according to the specific embodiment 9 with a corrugated strip lens array on top of the lens.

FIG. 20 shows the specific embodiment 9 according to present invention. The lower part of the lens in present embodiment is identical to the specific embodiment 1, while the emitting face 94 on top of the lens is a corrugated strip lens array, which may expand the emitting light beam in one direction and keep the emitting light beam collimated in the other direction. This embodiment may be used to provide such a light spot that the angle is narrow in one direction and broad in the other direction.

The foregoing description of an implementation of the invention has been presented for purpose of illustration and description. It is not exclusive and does not limit the invention to the precise form disclosed. Modifications and variations are possible in light of the above teachings or may be acquired from practicing the invention.

What is claimed is:

1. A lens comprising:
   (a) a lens body;
   (b) a total reflection surface provided on an outer side of the lens body, the reflection surface being in the form of a scalelike polyhedron;
   (c) a recess formed on a bottom side of the lens body at a central region thereof for accommodating a Light Emitting Diode (LED), the recess having a side surface and a central surface;
   (d) a micro lens array formed at the central surface of the recess; and
   (e) a light-emitting surface provided at a top side of the lens body;
   wherein a substantially uniform circular light spot is formed by the lens.

2. The lens as claimed in claim 1, wherein the LED is single-chip or multi-chip, with one or more colors of red, green or blue.

3. The lens as claimed in claim 1, wherein the scalelike polyhedron is any one from the group consisting of: rhomboid, diamond, square and spiral surfaces.

4. The lens as claimed in claim 1, wherein the side surface of the recess is in the shape of any one from the group consisting of: cylinder, cone and revolving arc.

5. The lens as claimed in claim 1, wherein the light-emitting surface comprises one or more planar and curved surfaces.

6. The lens as claimed in claim 1, wherein the light-emitting surface is any one from the group consisting of: concave spherical surface, convex spherical surface, aspherical surface, Fresnel surface, pillow lens array, and a corrugated strip surface.

7. The lens as claimed in claim 1, wherein each scale of the scalelike polyhedron of the reflection surface has a planar or arc curved surface.

8. The lens as claimed in claim 1, wherein the shape of micro lens array is any one from the group consisting: circular, hexagonal, square, corrugated, and radiant.

9. The lens as claimed in claim 1, wherein a part of the light emitting from the LED directed towards the side surface of the recess is refracted by the side surface, and is reflected by the reflection surface, and is refracted by and emitted from the light-emitting surface, generating a light distribution with an angle $\pm\theta$ (full beam angle of $2\theta$), where $\theta$ is 2° to 45°, and wherein the reflection surface is provided for breaking the boundary of light distribution, whereby every scale of the scalelike polyhedron of the reflection surface generates a range of light distribution of its own, based upon which the superposition of the light distribution from a plurality of scales form a considerably uniform light spot distribution at certain angle.

10. The lens as claimed in claim 1, wherein a part of light emitting from the LED directed towards the central surface of the recess is refracted by the central surface, and is refracted by and emitted from the light-emitting surface, generating a light distribution with an angle of $\pm\theta$, where $\theta$ is 2° to 45°, and wherein the micro lens array is provided for light blending.

11. The lens as claimed in claim 9, wherein the light reflected from the light striking at the lowermost edge of the reflection surface is parallel to the optical axis after being transmitted from said light-emitting surface, the light reflected from the light striking at the uppermost edge of the reflection surface forms an angle $\theta$ with the optical axis after being transmitted from said light-emitting surface; and the light reflected from the light striking at the surfaces between the uppermost and the lowermost edges of the reflection surface forms an angle with the optical axis ranging from 0~$\theta$ degrees according to certain ratio after being transmitted from said light-emitting surface.

12. The lens as claimed in claim 10, wherein the numerical aperture angle of each micro lens at the central surface of the recess is $\pm\theta$ (full beam angle of $2\theta$) in combination with the light-emitting surface.

13. The lens as claimed in claim 1, further comprising:
   a flange provided along a rim at a front side of the lens body; and
   legs formed on the flange for fixing the position of the lens body.

14. The lens as claimed in claim 1, wherein the rear side of the lens body is provided with a planar surface connecting the side surface of the recess and the reflection surface to facilitate the securing of the lens body to a base of the LED.

* * * * *